(12) United States Patent
Qu et al.

(10) Patent No.: US 11,384,860 B2
(45) Date of Patent: Jul. 12, 2022

(54) FLUID MICRO-INJECTION DEVICE AND FLOW CHANNEL ASSEMBLY THEREOF

(71) Applicant: CHANGZHOU MINGSEAL ROBOT TECHNOLOGY CO., LTD., Changzhou (CN)

(72) Inventors: Dongsheng Qu, Changzhou (CN); Jijiang Min, Changzhou (CN); Pei Sun, Changzhou (CN); Yangyang Mao, Changzhou (CN); Fuliang Gao, Changzhou (CN)

(73) Assignee: CHANGZHOU MINGSEAL ROBOT TECHNOLOGY CO., LTD., Changzhou (CN)

( * ) Notice: Subject to any disclaimer, the term of this patent is extended or adjusted under 35 U.S.C. 154(b) by 494 days.

(21) Appl. No.: 16/611,722

(22) PCT Filed: Jan. 20, 2018

(86) PCT No.: PCT/CN2018/073582
§ 371 (c)(1),
(2) Date: Nov. 7, 2019

(87) PCT Pub. No.: WO2018/205679
PCT Pub. Date: Nov. 15, 2018

(65) Prior Publication Data
US 2021/0138489 A1    May 13, 2021

(30) Foreign Application Priority Data

May 8, 2017  (CN) .......................... 201710319032.1
May 8, 2017  (CN) .......................... 201720506295.9

(51) Int. Cl.
*F16K 1/00*     (2006.01)
*F16K 31/44*    (2006.01)
*F16K 31/00*    (2006.01)

(52) U.S. Cl.
CPC ............... *F16K 31/44* (2013.01); *F16K 1/00* (2013.01); *F16K 31/004* (2013.01)

(58) Field of Classification Search
CPC ....... B05B 1/083; B05C 5/0225; F16K 31/44; F16K 31/004; F16K 1/00; F16K 99/0005;
(Continued)

(56) References Cited

U.S. PATENT DOCUMENTS 5,224,510 A * 7/1993 Pericles ................. G01N 30/20
                                                 137/341
6,261,367 B1 * 7/2001 Donges ................. B05C 5/0225
                                                 156/356
(Continued)

FOREIGN PATENT DOCUMENTS

CN      1847707      10/2006
CN      101479465     7/2009
(Continued)

OTHER PUBLICATIONS

English translation of the International Search Report from corresponding PCT Appln. No. PCT/CN2018/073582, dated Apr. 26, 2018.
(Continued)

*Primary Examiner* — Umashankar Venkatesan
(74) *Attorney, Agent, or Firm* — Grossman, Tucker, Perreault & Pfleger, PLLC (57) ABSTRACT

An execution system (100) for a fluid micro-injection device have a base body (110), a movable member (120), an executor, an adjusting member (130) and a plurality of clearance sheets. The movable member (120) is movably disposed on the base body (110). The executor and the adjusting member (130) are disposed in the base body (110). The plurality of clearance sheets are disposed between the
(Continued)

base body (110) and the adjusting member (130) to adjust a pre-tightening force of the executor.

18 Claims, 7 Drawing Sheets

(58) Field of Classification Search
CPC ......... F16K 99/0007; F16K 2099/0007; F16K 2099/0082
See application file for complete search history.

(56) References Cited

U.S. PATENT DOCUMENTS

| | | | | |
|---|---|---|---|---|
| 10,090,453 | B2* | 10/2018 | Conner | H01L 41/042 |
| 10,913,088 | B2* | 2/2021 | Fukada | B05C 5/0225 |
| 11,014,117 | B2* | 5/2021 | Levins | B05C 11/1042 |
| 2015/0300748 | A1* | 10/2015 | Hong | F04B 43/04 |
| | | | | 165/287 |
| 2020/0179974 | A1* | 6/2020 | Ikushima | B05C 5/027 |
| 2021/0023585 | A1* | 1/2021 | Fliess | B05B 1/083 |
| 2021/0354168 | A1* | 11/2021 | Fliess | B05C 5/001 |
| 2022/0040725 | A1* | 2/2022 | Fliess | B05C 5/0225 |

FOREIGN PATENT DOCUMENTS

| | | |
|---|---|---|
| CN | 203695245 | 7/2014 |
| CN | 204312818 | 5/2015 |
| CN | 104971840 | 10/2015 |
| CN | 107127065 | 9/2017 |
| CN | 107138300 | 9/2017 |
| CN | 206793956 | 12/2017 |
| CN | 206793960 | 12/2017 |
| EP | 1625892 | 2/2006 |
| FR | 2863512 | 6/2005 |
| KR | 10-1625337 | 5/2016 |

OTHER PUBLICATIONS

English translation of First Office Action from corresponding Chinese Appln. No. 201710319032.1, dated Mar. 27, 2019.
English translation of Second Office Action from corresponding Chinese Appln. No. 201710319032.1, dated Aug. 28, 2019.
Leixing, Precision of Transmission and Transformation Mechanism, dated Mar. 31, 2014, p. 257. English machine translation attached.

* cited by examiner

FLUID MICRO-INJECTION DEVICE AND FLOW CHANNEL ASSEMBLY THEREOF

FIELD

The present disclosure relates to an execution system for a fluid micro-injection device and a fluid micro-injection device having the same.

BACKGROUND

The existing fluid micro-injection device uses a flexible hinge mechanism or an operating element to perform a secondary movement of a closing element by a lever, thereby achieving micro-injection of fluid. Both ends of the closing element may be worn by the secondary movement so that replacement frequency and maintenance cost are increased accordingly. Further, lifting height of the closing element may not be adjusted or the adjustment precision thereof is low. Accordingly, the impact force required for fluid ejection is not adjustable or inaccurately adjusted, thus fluid ejection effect may not meet requirements. Furthermore, installation and disassembly of related mountings is cumbersome, resulting in low installation efficiency, inconvenient maintenance or replacement.

SUMMARY

The present disclosure aims to solve at least one of technical problems existing in the art.

To this end, the present disclosure may provide an execution system for a fluid micro-injection device, which may be convenient for accuracy adjustment with excellent fluid ejection effect.

The present disclosure may also provide a fluid micro-injection device having the above-described execution system.

According to a first aspect of the present disclosure, an execution system for a fluid micro-injection device may comprises a base body defining an executor mounting cavity therein, and the base body being provided with a positioning hole that communicates with the executor mounting cavity; a movable member movably disposed in the positioning hole; an executor movably disposed within the executor mounting cavity, the executor being connected to the movable member to control movement of the movable member; an adjusting member disposed in the executor mounting cavity and connected to the executor to adjust an operating position of the executor; and a plurality of clearance sheets disposed between an inner wall surface of the executor mounting cavity and the adjusting member to adjust a pre-tightening force of the executor.

According to the execution system for the fluid micro-injecting device according to the embodiment of the present disclosure, the number or thickness of the clearance sheets may be adjusted by providing the adjusting member and the plurality of clearance sheets, which cooperate with the executor. Therefore, a pre-tightening force of the executor may be adjusted, thus adjusting the fluid ejection effect of the fluid micro-injection device.

According to an embodiment of the present disclosure, the executor may comprise: a lever disposed in the executor mounting cavity, both ends of the lever may be movable, in which a first end of the lever may be connected to the movable member to control movement of the movable member; an actuator telescopically disposed within the executor mounting cavity, the actuator being connected to a second end of the lever to adjust an operating position of the actuator, the clearance sheets being disposed between the inner wall surface of the executor mounting cavity and the adjusting member to adjust a pre-tensioning force of the actuator; and a controller connected to the actuator to control extension and draw back of the actuator.

According to an embodiment of the present disclosure, the executor may further comprise a swing pin shaft disposed within the executor mounting cavity, an axis of the swing pin shaft being perpendicular to an axis of the actuator and offset from the axis of the actuator in a horizontal direction, and the second end of the lever may be connected to the swing pin shaft to pivot about the swing pin shaft.

According to an embodiment of the present disclosure, the swing pin shaft may be formed in a column shape, and the base body may be provided with a positioning groove adapted to mount the swing pin shaft. A lower surface at the second end of the level may be provided with a fitting concave surface that may fit with the swing pin shaft, and the swing pin shaft may be disposed between the positioning groove and the fitting concave surface.

According to an embodiment of the present disclosure, a cross section of the positioning groove may be formed in an arcuate shape and a radius of the positioning groove may be equal to that of the swing pin shaft. A cross section of the fitting concave surface may be formed in an arcuate shape and a radius of the fitting concave surface may be larger than that of the swing pin shaft.

According to an embodiment of the present disclosure, one end of the swing pin shaft may be provided with an end boss, and the end boss may abut against a bottom surface at the second end of the lever to limit a mounting height of the lever.

According to an embodiment of the present disclosure, the adjusting member may be provided at an upper end of the actuator, an upper actuator top block may be disposed between the adjusting member and the upper end of the actuator, a lower actuator top block may be disposed between a lower end of the actuator and the second end of the lever, and the lower actuator top block may abut against the lower end of the actuator and the second end of the lever.

According to an embodiment of the present disclosure, a lower surface of the adjusting member may be formed as an upwardly concave curved surface, an upper surface of the upper actuator top block may be formed as an upwardly projecting curved surface, and a radius of the upper surface of the upper actuator top block may be smaller than that of the lower surface of the adjustment element.

According to an embodiment of the present disclosure, an upper surface of the second end of the lever may be provided with a first protrusion, a cross section of which may be formed into an arcuate shape, and a lower surface of the lower actuator top block may be provided with a notch, a cross section of which may be formed in an arcuate shape, and a radius of the first projection may be smaller than that of the notch.

According to an embodiment of the present disclosure, a lower surface of the first end of the lever may be provided with a second protrusion, a cross section of which may be formed with an arcuate shape and the second protrusion may abut against an upper end surface of the movable member.

According to an embodiment of the present disclosure, the execution system may further comprise a guiding seat disposed in the positioning hole. The guiding seat may be provided with a guiding hole penetrating through in an axial direction thereof, and the movable member is movably disposed on the guiding seat along the axial direction of the guiding hole.

According to an embodiment of the present disclosure, the movable member may comprise: a cylindrical shaft movably disposed in the guiding hole along an axial direction thereof, and a lower end of the cylindrical shaft being formed as a ball head; and an upper end part disposed at an upper end of the cylindrical shaft, the upper end part having a size larger than a radius of the cylindrical shaft, and a first elastic element being disposed between the upper end part and the guiding seat.

According to an embodiment of the present disclosure, the guiding seat may comprise: a positioning boss detachably disposed in the positioning hole; and an upper convex cylinder disposed at an upper portion of the positioning boss and disposed coaxially with the positioning boss. A radial dimension of the upper convex cylinder may be smaller than that of the positioning boss, the guiding hole may penetrate through the upper convex cylinder and the positioning boss, and the first elastic element may be formed as a spring that may sleeve upon the upper convex cylinder with both ends abutting against the positioning boss and the upper end part respectively.

According to an embodiment of the present disclosure, one end of the positioning hole communicating with the executor mounting cavity may be provided with a positioning recess having a radial dimension larger than that of the positioning hole. And the execution system may further comprise a positioning seat disposed in the positioning recess, the guiding seat extending through the positioning seat in the axial direction, and a second elastic element disposed between the positioning seat and the first end of the lever.

According to an embodiment of the present disclosure, the second elastic element may be formed as a spring with both ends of the second elastic element abutting against an upper surface of the positioning seat and a lower surface of the first end of the lever respectively.

According to an embodiment of the present disclosure, an outer contour of the positioning seat may be formed substantially in a square shape, an outer circumference of the upper surface of the positioning seat may be provided with a plurality of projecting portions circumferentially spaced apart, and inner surfaces of each of the projecting portions may be respectively formed as arcuate faces corresponding to the outer contour shape of the second elastic element.

According to an embodiment of the second aspect of the present disclosure, a fluid micro-injection device may comprise the execution system for the fluid micro-injection device according to the above described embodiment(s).

The additional aspects and advantages of the present disclosure will be set forth and apparent in part in the following description or be learned by practicing the present disclosure.

BRIEF DESCRIPTION OF THE DRAWINGS

The above and/or additional aspects and advantages of the present disclosure will become apparent and readily understood from the following attached drawings, wherein.

DRAWING REFERENCE SIGNS

Execution system 100;
Base body 110; Executor mounting cavity 111; Positioning hole 112; Positioning recess 1121; Positioning groove 113; Controller mounting cavity 114;
Movable member 120; Cylindrical shaft 121; Ball head 122; Upper end part 123;
Adjusting member 130;
Lever 141; Fitting concave surface 1411; First protrusion 1412; Second protrusion 1413;
Actuator 142; Controller 143; Upper actuator top block 144; Lower actuator top block 145; Notch 1451; Swing pin shaft 146; End boss 1461;
Guiding seat 150; Guiding hole 151; Positioning boss 152; Mounting notch 1521; Upper convex cylinder 153;
First elastic element 160;
Positioning seat 170; Protruding portion 171;
Second elastic element 180.

DETAILED DESCRIPTION

Embodiments of the present disclosure will be described hereinafter in detail. Examples of the embodiments are illustrated in the drawings, wherein the same or similar reference numerals refer to the same or similar elements or elements having the same or similar functions. The embodiments described below with reference to the accompanying drawings are illustrative to explain the present disclosure and should not be construed as being limited to the present disclosure.

In the description of the present disclosure, it should be understood that terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential" and the like refer to orientation and positional relationship based on the orientation or positional relationship shown in the drawings. Those merely intend to describe the present disclosure and simplify description, and do not indicate or imply that the indicated devices or components must be constructed and operated in a particular orientation. Therefore, the above cannot be construed as being limited to the present disclosure. Furthermore, features defining "first" and "second" may explicitly or implicitly include one or more features. In the description of the present disclosure, "plurality" means two or more, unless otherwise stated.

In the description of the present disclosure, it should be noted that the terms "installation", "attached", and "connected" should be understood widely, and for example, the terms may refer to be fixedly or detachable or integrally connected; mechanical or electrical connection; directly connected, or indirectly connected through an intermediate medium, or internal communication of two components, unless otherwise explicitly stated and defined. The specific meaning of the above terms in the present disclosure can be understood in a specific case by those skilled in the art.

An execution system 100 for a fluid micro-injection device according to an embodiment of the present disclosure may be specifically described below with reference to the accompanying drawings.

As shown in FIGS. 1-9, the execution system 100 for a fluid micro-injection device according to an embodiment of the present disclosure may include a base body 110, a movable member 120, an executor, an adjusting member 130 and a plurality of clearance sheets.

Figure 1:
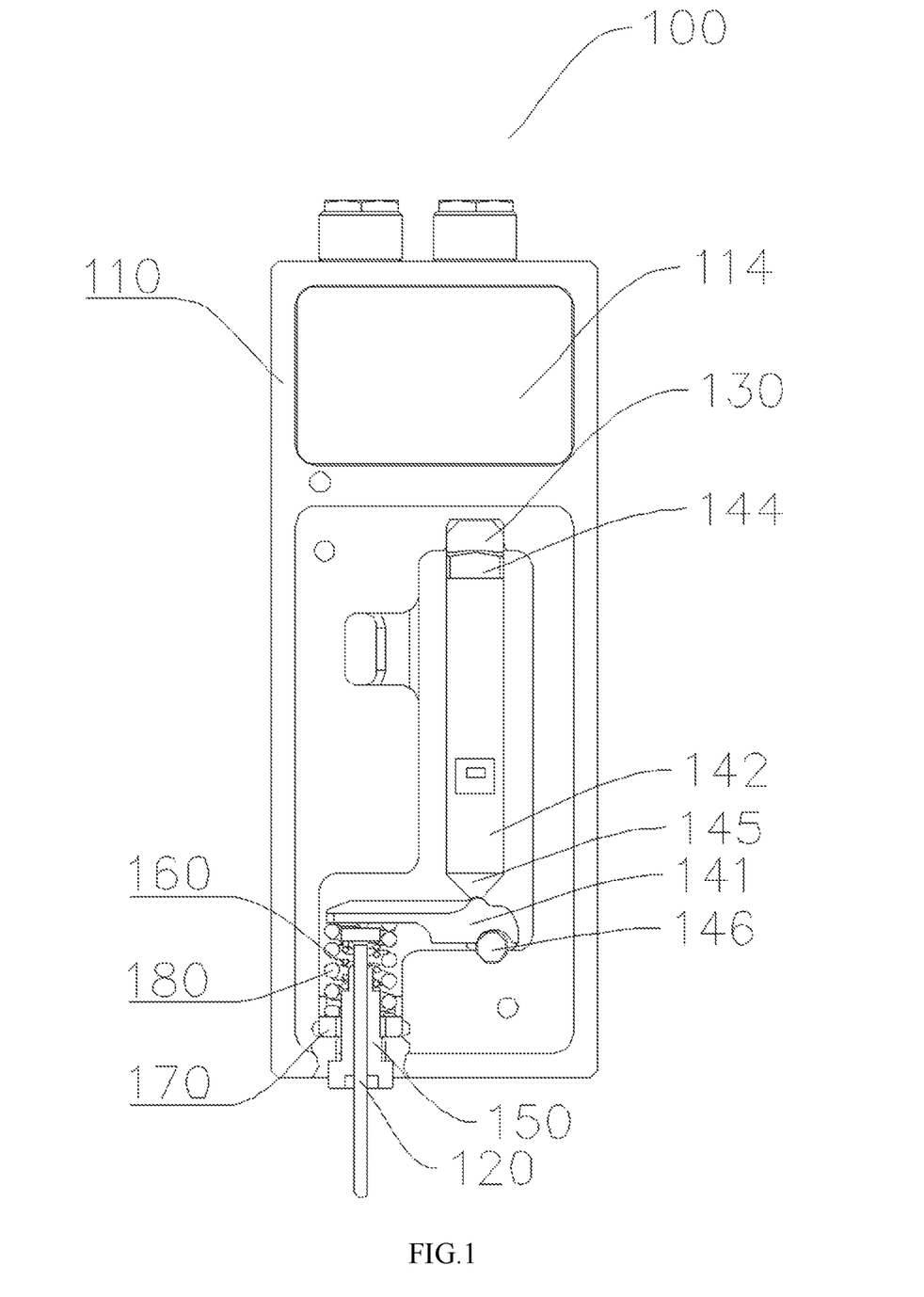
FIG. 1 is a schematic view showing a structure of an execution system for a fluid micro-injection device according to an embodiment of the present disclosure.

Specifically, the base body 110 may include an executor mounting cavity 111 defined therein. The base body 110 may be provided with a positioning hole 112 that may be communicated with the executor mounting cavity 111. The movable member 120 is movably disposed in the positioning hole 112. The executor may be movably disposed in the executor mounting cavity 111. The executor may be connected with the movable member 120 to control movement of the movable member 120. The adjusting member 130 may be disposed in the executor mounting cavity 111 and connected with the executor to adjust the working position of the executor. The plurality of clearance sheets may be disposed between an inner wall surface of the executor mounting cavity 111 and the adjusting member 130 so as to adjust a pre-tightening force of the executor.

Figure 2:
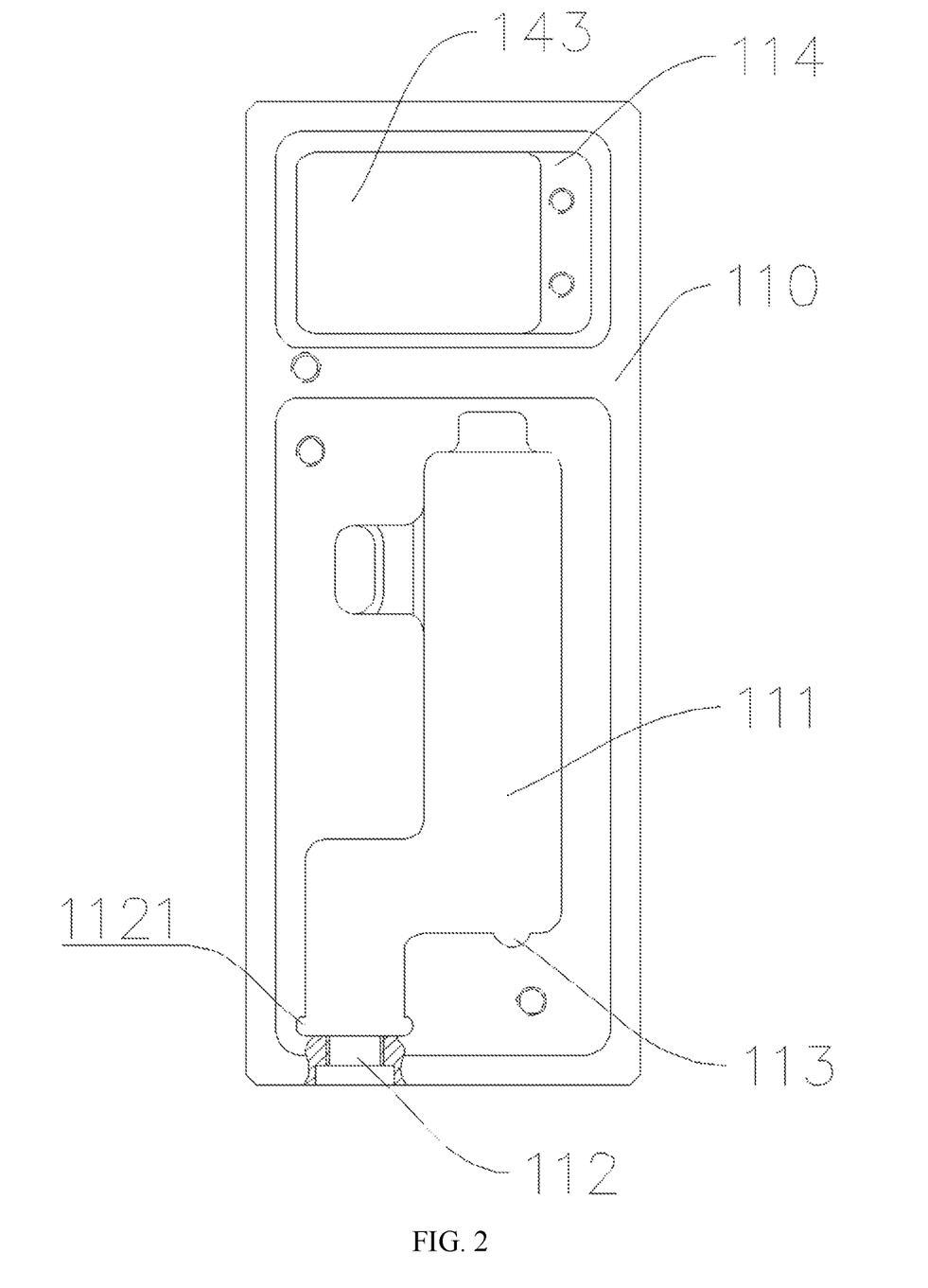
FIG. 2 is a schematic view showing a structure of a base body of the execution system for the fluid micro-injection device according to an embodiment of the present disclosure.

As shown in FIG. 2, the base body 110 may be provided with the executor mounting cavity 111 and the positioning hole 112. The executor may be mounted in the executor mounting cavity 111. The movable member 120 may be disposed in the positioning hole 112 and cooperate with the executor to be operated by the executor. The adjusting member 130 may be also disposed in the executor mounting cavity 111 and connected to at least a portion of the executor to adjust the working position of the executor. A plurality of clearance sheets may be provided between the adjusting member 130 and the inner wall surface of the executor mounting cavity 111. The number or thickness of the clearance sheets may be adjusted so that the executor can be squeezed to different degrees. Accordingly, the executor may be brought to an improved initial motion state, to achieve the purpose of adjusting the fluid ejection effect of the injection system 100.

It should be noted that the fluid micro-injection device according to the embodiment of the present disclosure may comprise an execution system 100 and a flow channel assembly. The execution system 100 may be mainly used to control operation of the movable member 120. The flow channel assembly may be provided with a flow channel communicating with a fluid accommodation structure. The execution system 100 may control the opening or closing of a nozzle in the flow channel assembly by controlling the movable member 120 and the operating displacement when the execution system may cooperate with the flow channel assembly, thus the fluid micro-injection device may be opened or closed, or the injecting effect of the fluid micro-injection device may be adjusted accordingly. Further, the structure of the flow channel assembly may be easily understood or implemented by those skilled in the art and therefore will not be described herein in detail.

Thus, by providing the adjusting member 130 and the plurality of clearance sheets, adjusting the number or thickness of the clearance sheets, the execution system 100 for the fluid micro-injection device according to the embodiment of the present disclosure may adjust the pre-tightening force of the executor, so that the executor may obtain an improved pre-tightening force, thereby adjusting the fluid ejection effect of the fluid micro-injection device.

According to an embodiment of the present disclosure, the executor may include a lever 141, an actuator 142, and a controller 143.

Specifically, the lever 141 may be disposed in the executor mounting cavity 111 and both ends of the lever 141 may be movable. A first end of the lever 141 may be connected to the movable member 120 to control movement of the movable member 120. The actuator 142 may be telescopically disposed in the executor mounting cavity 111. The actuator 142 may be connected to a second end of the lever 141 to control the movement of the lever 141. The adjusting member 130 may be connected to the actuator 142 to adjust an actuating position of the actuator. The clearance sheets may be mounted between the inner wall surface of the executor mounting cavity 111 and the adjusting member 130 to adjust the pre-tightening force of the actuator 142. The controller 143 may be connected to the actuator 142 to control extension and draw back of the actuator 142.

As shown in FIG. 1, the left end shown in the figure may be the first end of the lever 141, and the right end of the figure may be the second end of the lever 141. The lever 141 may be rotatable about an axis in a horizontal direction. The left end of the lever 141 may be connected to an upper end of the movable member 120 so as to drive the movable member 120 to move in an up-down direction when the lever 141 may move in the up-down direction. The actuator 142 may be provided at the right end of the lever 141 and may be telescopic in the up-down direction. The lower end of the actuator 142 may be connected to the right end of the lever 141. The actuator 142 may extend and draw back in the up-down direction to press or release the right end of the lever 141. The adjusting member 130 may be connected with the upper end of the actuator 142. A downward force pressing the actuator 142 may be adjusted by adjusting the number or thickness of the clearance sheets between the inner wall surface of the executor mounting cavity 111 and the adjusting member 130. Thereby, a downward force of the actuator 142 pressing the right end of the lever 141 may be adjusted so that the actuator 142 may obtain an improved initial moving state. The displacement of the executor may be achieved by different displacements of the actuator 142 at different voltages. In addition, a controller mounting cavity 114 for mounting the controller 143 may be disposed within the base body 110.

According to the execution system 100 of the embodiment of the present disclosure as described hereinabove, the lever 141, the actuator 142 and the adjusting member 130 may cooperate to conveniently adjust displacement of the movable member 120, thus adjusting the fluid ejection effect of the fluid micro-injection device. Further, the structure may be simple, with convenient operation. And the moving displacement of the movable member 120 may be more precisely adjusted by controlling the thickness of the clearance sheets.

According to an embodiment of the present disclosure, the executor may further include a swing pin shaft 146 disposed in the executor mounting cavity 111. An axis of the swing pin shaft 146 may be perpendicular to the axis of the actuator 142 and both may be staggered in the horizontal direction. The second end of the lever 141 may be connected to the swing pin shaft 146 to pivot about the swing pin shaft 146.

Further, the swing pin shaft 146 may be formed into a column shape. The base body 110 may be provided with a positioning groove 113 adapted to mount the swing pin shaft 146. A lower surface of the second end of the lever 141 may be provided with a fitting concave surface 1411 to be fitted with the swing pin shaft 146. The swing pin shaft 146 may be disposed between the positioning groove 113 and the fitting concave surface 1411.

Specifically, the base body 110 may be provided with the positioning groove 113, as shown in FIG. 2. The positioning groove 113 may be provided with the swing pin shaft 146 therein. The lower surface of the right end of the lever 141 may be provided with the fitting concave surface 1411, which may fit with the swing pin shaft 146. The lever 141 may be pivotally disposed within the executor mounting cavity 111 about the axis of the swing pin shaft 146. It should be noted that the axis of the actuator 142 may be offset from the axis of the swing pin shaft 146 in the horizontal direction. A contact point of the actuator 142 with the lever 141 may be located at the left side of the swing pin shaft 146. That is to say, a contact point of the lever 141 with the movable member 120 and the contact point of the lever 141 with the actuator 142 may be located on the same side of the swing pin shaft 146. Accordingly, the moving displacement of the right end of the lever 141 caused by a force applied to the right end of the lever 141 by the actuator 142 may be magnified at the left end of the lever 141 when the actuator 142 may extend or draw back. Thus, the displacement of the movable member 120 may be conveniently adjusted with accuracy by a small displacement adjustment at the right end of the level 141.

In some embodiments of the present disclosure, a cross section of the positioning groove 113 may be formed into an arcuate shape and the radius of the positioning groove 113 may be equal to the radius of the swing pin shaft 146. Therefore, the swing pin shaft 146 may be positioned and immobile in the positioning groove 113. A cross section of the fitting concave surface 1411 may be formed into an arcuate shape and the radius of the fitting concave surface 1411 may be larger than the radius of the swing pin shaft 146. This may facilitate formation of the rotational line contact, reduce influence of the frictional force, and ensure displacement and force transmission of the actuator 142.

Figure 4:
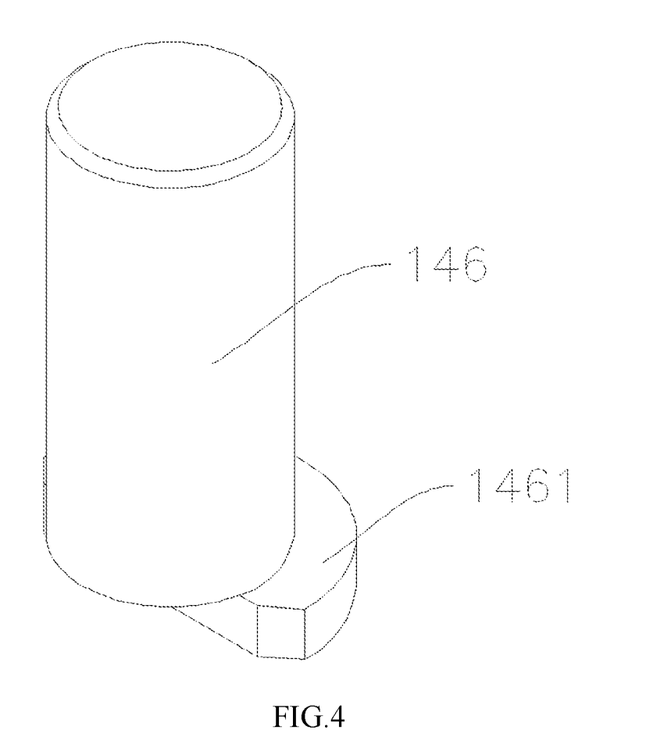
FIG. 4 is a schematic view showing a structure of a swing pin shaft of the execution system for the fluid micro-injection device according to an embodiment of the present disclosure.

According to an embodiment of the present disclosure, one end of the swing pin shaft 146 may be provided with an end boss 1461 that may abut against a bottom surface of the second end of the lever 141 to limit a mounting height of the lever 141. Specifically, as shown in FIG. 4, one end of the swing pin shaft 146 may be provided with a semi-circular end boss 1461, which may abut against a bottom surface of the right end of the lever 141 and limit the mounting height of the lever 141 to facilitate assembly accordingly.

As shown in FIG. 1, in some embodiments of the present disclosure, the adjusting member 130 may be disposed at the upper end of the actuator 142 and an upper actuator top block 144 may be disposed between the adjusting member 130 and the upper end of the actuator 142. A lower actuator top block 145 may be disposed between the lower end of the actuator 142 and the second end of the lever 141. The lower actuator top block 145 may abut against the lower end of the actuator 142 and the second end of the lever 141.

That is, the upper and lower ends of the actuator 142 may be respectively provided with a top block structure to prevent the actuator 142 from directly contacting with the lever 141 or the base body 110, wherein the upper end of the actuator 142 may be provided with the upper actuator top block 144 and the lower end of the actuator 142 may be provided with the lower actuator top block 145. The actuator 142 may be abutted against the adjusting member 130 by the upper actuator top block 144, and may be abutted against the lever 141 by the lower actuator top block 145.

According to an embodiment of the present disclosure, the lower surface of the adjusting member 130 may be formed as a curved or arc-shaped surface, which may be concaved upwardly. The upper surface of the upper actuator top block 144 may be formed as a curved or arc-shaped surface, which projects upwardly. A radius of the upper surface of the upper actuator top block 144 may be smaller than that of the lower surface of the adjusting member 130.

As shown in FIG. 1, surfaces of the adjusting member 130 fitting with the upper actuator top block 144 may be respectively formed as curved faces, thereby defining a lateral displacement of the actuator 142. A convex face radius of the upper surface of the upper actuator top block 144 may be smaller than a concave face radius of the adjusting member 130, thus forming a point contact to facilitate automatic adjustment of the position of the actuator 142.

Alternatively, according to some embodiments of the present disclosure, the upper surface of the second end of the lever 141 may be provided with a first protrusion 1412, of which a cross section may be formed in an arcuate shape. The lower surface of the lower actuator top block 145 may be provided with a notch 1451, of which a cross section may be formed in an arcuate shape. A radius of the first protrusion 1412 may be smaller than that of the notch 1451.

Further, the lower surface of the first end of the lever 141 may be provided with a second protrusion 1413. a cross section of the second protrusion 1413 may be formed in an arcuate shape and abut against an upper end surface of the movable member 120.

Figure 3:
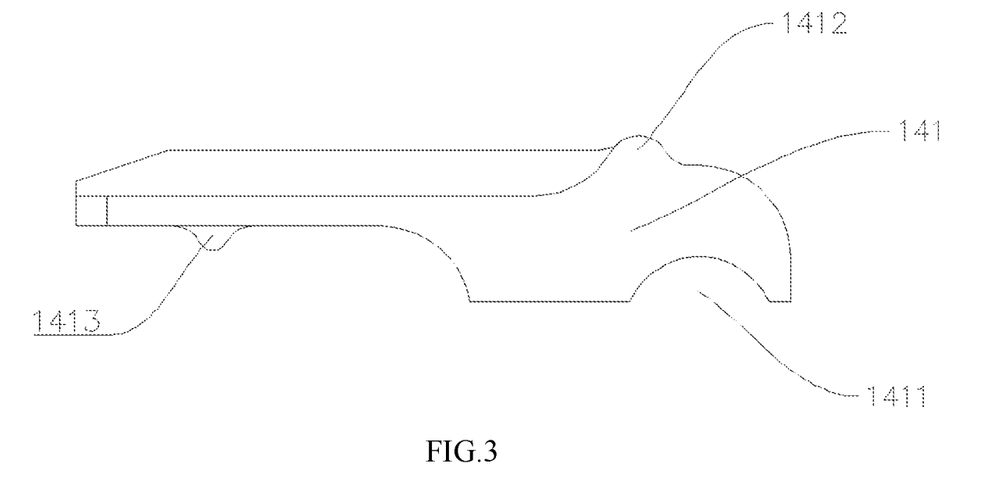
FIG. 3 is a schematic view showing a structure of a lever of the execution system for the fluid micro-injection device according to an embodiment of the present disclosure.

Specifically, the upper surface of the right end of the lever 141 may be provided with the first protrusion 1412, and the lower surface of the lower actuator top block 145 may be provided with a notch 1451 that has a concave face radius larger than the convex face radius of the protrusion, as shown in FIGS. 1 and 3. This may facilitate formation of line contact, reducing influence of the friction force, and ensuring displacement and force transmission of the actuator 142. The lower surface of the left end of the lever 141 may be provided with the second protrusion 1413 that may abut against the upper end surface of the movable member 120. The arcuate-shaped convex structure may facilitate formation of line contact and reduce influence of the friction force.

Inter alia, the lever 141 may have a high rigidity to ensure that the contacting surfaces may not deform after long-term usage, which may otherwise affect displacement or force transmission.

Figure 6:
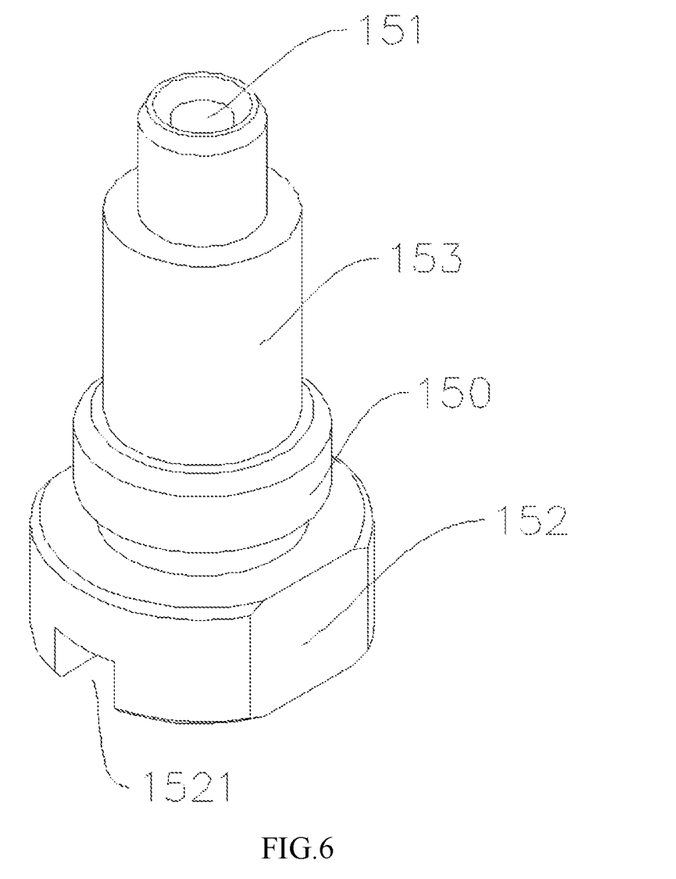
FIG. 6 is a schematic view showing a structure of a guiding seat of the execution system for the fluid micro-injection device according to an embodiment of the present disclosure.
Figure 7:
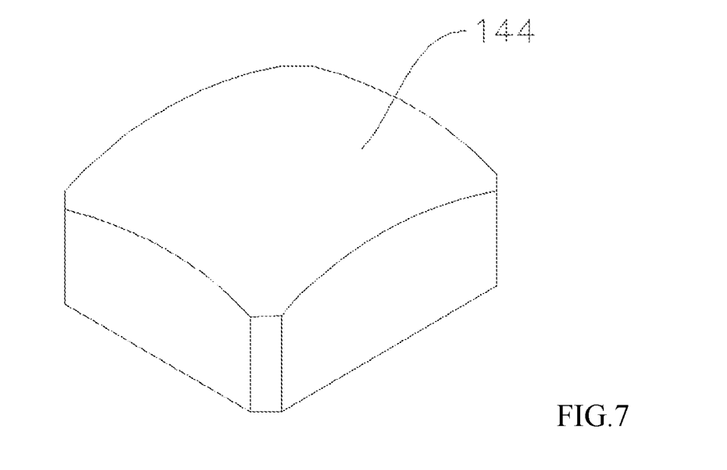
FIG. 7 is a schematic view showing a structure of an upper actuator top block of the execution system for the fluid micro-injection device according to an embodiment of the present disclosure.
Figure 8:
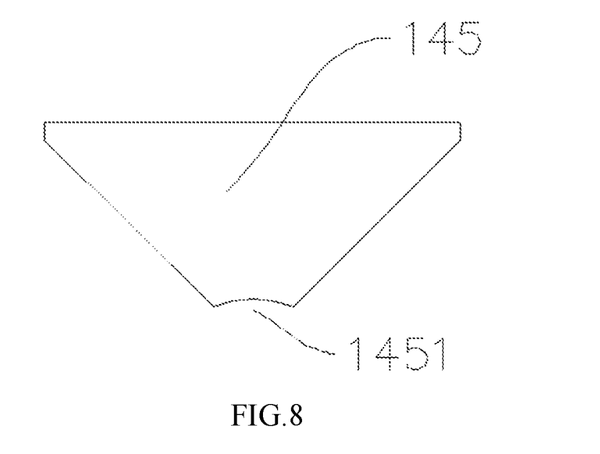
FIG. 8 is a schematic view showing a structure of a lower actuator top block of the execution system for the fluid micro-injection device according to an embodiment of the present disclosure.
Figure 9:
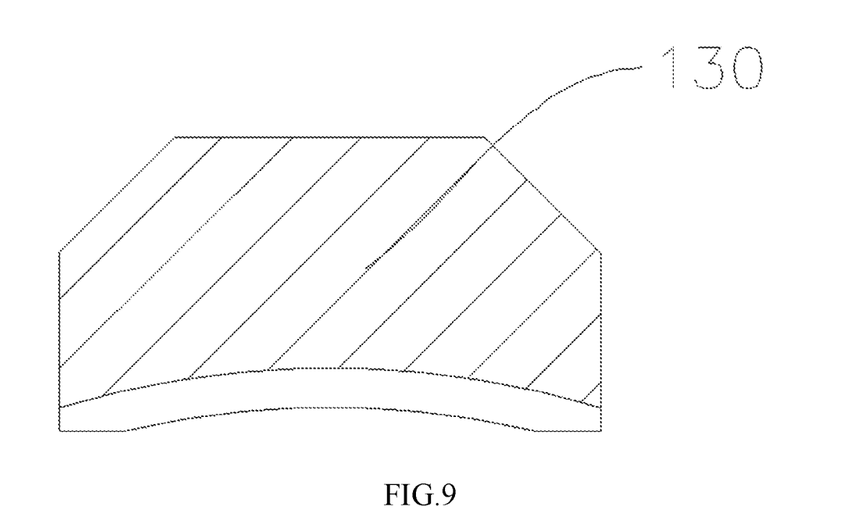
FIG. 9 is a schematic view showing a structure of an adjusting member of the execution system for the fluid micro-injection device according to an embodiment of the present disclosure.

According to an embodiment of the present disclosure, the execution system 100 of the fluid micro-injection device may further comprise a guiding seat 150. The guiding seat 150 may be disposed in the positioning hole 112. The guiding seat 150 may be provided with a guiding hole 151 extending therethrough along an axial direction thereof. The movable member 120 may be movably disposed in the guiding seat 150 in the axial direction of the guiding hole 151. Accordingly, a moving trajectory of the movable member 120 may be ensured and an operational stability of the movable member can be improved accordingly.

Figure 5:
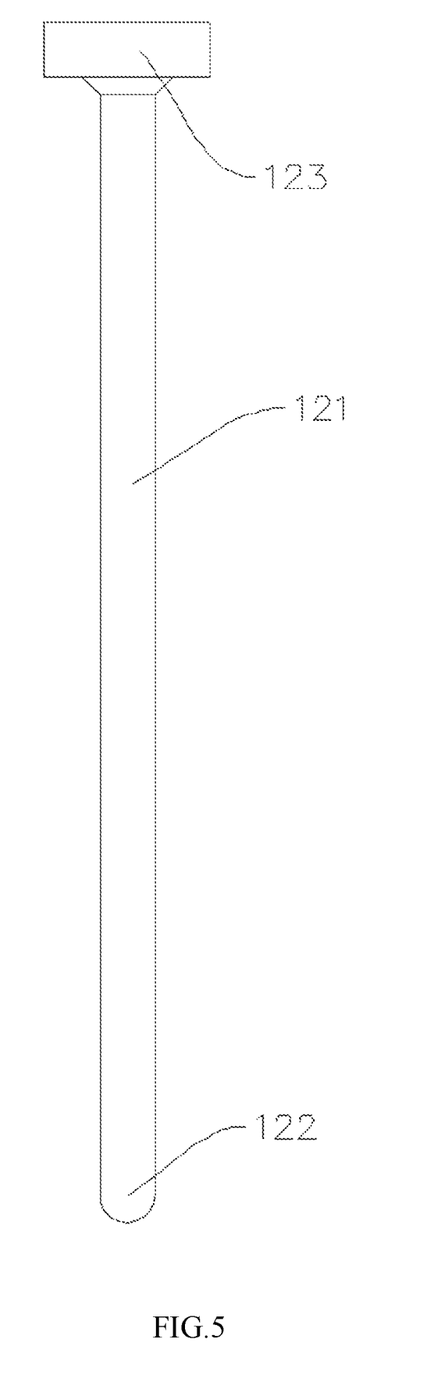
FIG. 5 is a schematic view showing a structure of a movable member of the execution system for the fluid micro-injection device according to an embodiment of the present disclosure.

Alternatively, the movable member 120 may comprise a cylindrical shaft 121 and an upper end part 123, as shown in FIG. 5. The cylindrical shaft 121 may be movably disposed in the guiding hole 151 in the axial direction thereof. The lower end of the cylindrical shaft 121 may be formed as a ball head 122. The upper end part 123 may be disposed at an upper end of the cylindrical shaft 121. The upper end part 123 may have a size larger than a radius of the cylindrical shaft 121. A first elastic element 160 may be disposed between the upper end part 123 and the guiding seat 150.

The cylindrical shaft 121 may be perpendicular to the upper end part 123 and fit with the guiding hole 151, so that the movable member 120 may move in the up-down direction along the guiding hole 151. The ball head 122 may be coaxial with the nozzle of the flow channel assembly and in close contact therewith, so that the fluid may be sealed in the flow channel assembly.

Thus, by the first elastic element 160 provided between the movable member 120 and the guiding seat 150, the movable member 120 may be restored to the original position under a restoring force of the first elastic element 160 after the force releasing of the lever 141 to the movable member 120. Therefore, switching and adjustment of the flow channel assembly may be realized, which may be convenient to use and operate.

In some embodiments of the present disclosure, the guiding seat 150 may comprise a positioning boss 152 and an upper convex cylinder 153. The positioning boss 152 may be detachably, like threadedly etc., disposed in the positioning hole 112. After the tightening of the positioning boss 152 with the positioning hole 112 of the base body 110. A bottom surface of the positioning boss 152 may be flush with the bottom surface of the base body 110, and the axis of the guiding seat 150 may be coaxial with the positioning hole 112 and perpendicular to the bottom surface of the base body 110.

The upper convex cylinder 153 may be disposed on an upper portion of the positioning boss 152 and disposed coaxially with the positioning boss 152. A radial dimension of the upper convex cylinder 153 may be smaller than that of the positioning boss 152. The guiding hole 151 may penetrate through the upper convex cylinder 153 and the positioning boss 152. The first elastic element 160 may be formed as a spring which may be fitted over the upper convex cylinder 153 with both ends thereof being abut against the positioning boss 152 and the upper end part 123 respectively. Therefore, the guiding seat 150 may fit with the spring to ensure stable spring assembly. Meanwhile, the upper end part 123 may transmit an opposing force of the first elastic element 60 to the base body 110 to ensure a stable force of the first elastic element 60 accordingly.

In addition, a mounting notch 1521 may be disposed on the positioning boss 152 to facilitate in-line engagement of the positioning boss 152, thus facilitating mounting and dismounting of the guiding seat 150 and the base body 110.

According to an embodiment of the present disclosure, one end of the positioning hole 112 communicating with the executor mounting cavity 111 may be provided with a positioning recess 1121, which may have a radius larger than that of the positioning hole 112. The execution system 100 may further comprise a positioning seat 170 and a second elastic element 180.

Specifically, the positioning seat 170 may be disposed in the positioning groove 1121. The guiding seat 150 may extend through the positioning seat 170 in the axial direction. The second elastic element 180 may be disposed between the positioning seat 170 and the first end of the lever 141. Alternatively, the second elastic element 180 may be formed as a spring, and both ends of the second elastic element 180 may abut against the upper surface of the positioning seat 170 and the lower surface of the first end of the lever 141 respectively.

That is, the positioning seat 170 may be further disposed in the positioning hole 112. The positioning seat 170 may be fixed in the positioning groove 1121 of the positioning seat 112. The second elastic element 180 may be disposed between the positioning seat 170 and the left end of the lever 141. The second elastic element 180 may be a spring fitted over the first elastic element 160.

The upper end surface of the second elastic element 180 may be perpendicular to the axis of the second elastic element 180 and may be in close contact with bottom of the left end of the lever 141 to facilitate transmission of a force acting on the lever 141 so that the lever 141 may reach the corresponding position in time. The lower end surface of the second elastic element 180 may be perpendicular to the axis of the second elastic element 180 and may be in close contact with the positioning seat 170, so that a reverse force may be transmitted to the base body 110 through the positioning seat 170 to ensure force stability. The second elastic element 180 may have an outer diameter that may be fit with that of a counterbore of the positioning seat 170 to ensure that the stable positioning of the second elastic element 180.

Figure 10:
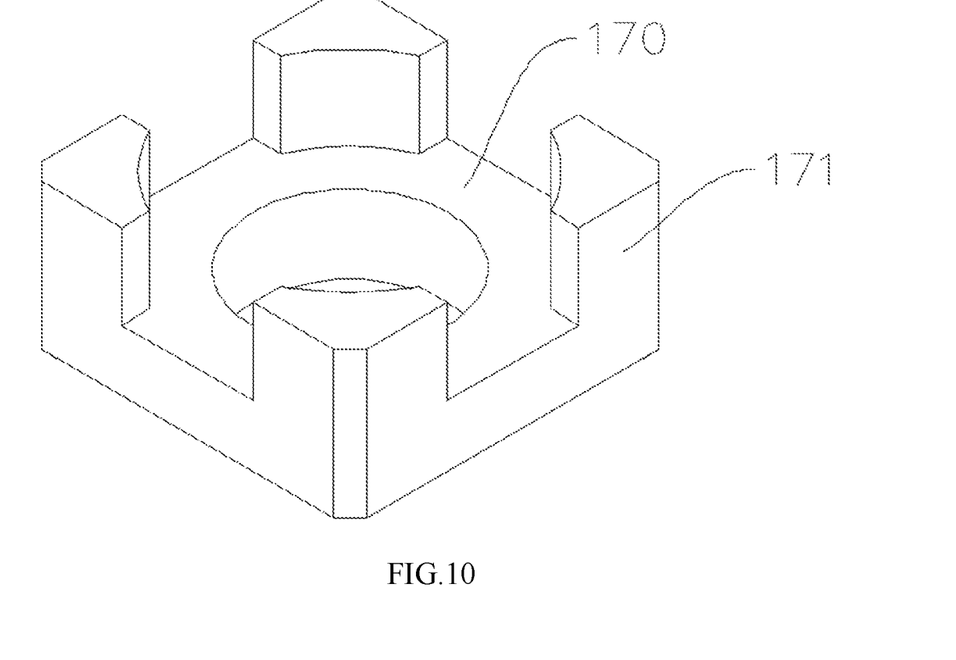
FIG. 10 is a schematic view showing a structure of a positioning seat of the execution system for the fluid micro-injection device according to an embodiment of the present disclosure.

According to an embodiment of the present disclosure, an outer contour of the positioning seat 170 may be formed substantially in a square shape, as shown in FIG. 10. The outer circumference of the upper surface of the positioning seat 170 may be provided with a plurality of projecting portions 171 in interval. The inner surface of each projecting portions 171 may be respectively formed as arcuate face corresponding to that of the outer contour of the second elastic element 180. The inner surface of the projecting portion 171 may be formed into an arcuate face, which may fit with the outer diameter of the second elastic element 180 to ensure the stable positioning thereof. The structure of the projecting portion 171 may limit the position of the second elastic element 180 to improve structural stability thereof.

The assembly process and feature of the execution system 100 for the fluid micro-injection device according to an embodiment of the present disclosure may be specifically described below.

Firstly, the positioning seat 170 and the second elastic element 180 may be assembled and then mounted into the positioning recess 1121 of the base body 110. The bottom surface of the positioning seat 170 may abut against the bottom surface of the positioning recess 1121. The swing pin shaft 146 may then be mounted into the positioning groove 113, and an end boss 1461 of the swing pin shaft 146 may point downwardly. Next, the lever 141 may be mounted and the fitting concave surface 1411 of the lever 141 may be fitted with the swing pin shaft 146. The left end of the level may abut against the upper end surface of the second elastic element 180, and the lower surface of the level may abut against the boss face of the end boss 1461.

The adjusting member 130, the upper actuator top block 144, the actuator 142 and the lower actuator top block 145 may be then sequentially mounted into the base body 110. A side surface of the adjusting member 130 may be fitted with a side surface of the base body 110. The notch 1451 of the lower actuator top block 145 may fit with the first protrusion 1412 at the right end of the lever 141. The movable member 120, the first elastic element 160 and the guiding seat 150 may be assembled together and screwed into the positioning hole 112 via threads on the guiding seat 150. Thus, the execution system 100 for the fluid micro-injection device may be assembled with parts being closely fitted with each other. Except the swinging degree freedom, all other degrees of freedom are limited.

The assembly features of the various components of the execution system 100 for the fluid micro-injection device may be described as follows.

The actuator 142, the upper actuator top block 144 and the lower actuator top block 145 may need to be tightly assembled, therefore, bonding may be an option. A gauge block may be used to calibrate positions of these three elements during bonding, thus ensuring the center of the upper actuator top block 144 being located on the axis of the piezoelectric actuator 142. The concave face axis of the notch 1451 of the lower actuator top block 145 may intersect with and be perpendicular to the axis of the piezoelectric actuator 142.

The lever 141 may be moved downwardly by an assembly tool during assembly to compress the second elastic element 180. Thus, the position of the convex surface at the right end of the lever 141 may be lowered to help the mounting of the upper actuator top block 144 and the piezoelectric actuator 142 of the lower actuator top block 145 bonded together. The adjusting member 130 may be mounted into an adjusting recess of the base body 110 of the execution system 100, and the arcuate convex surface of the upper actuator top block 144 may be then fitted into the arcuate concave surface of the adjusting member 130. After that, the notch 1451 of the lower actuator top block 145 may be assembled with the first protrusion 1412 of the lever 141. The piezoelectric actuator 142 may be finally assembled.

The clearance sheets with a certain thickness may be provided between the plane of the adjusting member 130 and an upper plane of the adjusting recess of the base body 110. Accordingly, a reversing force of the second elastic element 180 acting on the left end of the lever 141 may be kept balance with a force of the piezoelectric actuator 142 acting on the right end of the lever 141. A pre-tightening force may be applied to the piezoelectric actuator 142 and the lever 141 at this time may be brought to a horizontal state.

The first elastic element 160 may be housed in the convex cylinder 153 of the guiding seat 150. The movable member 120 may be mounted into the guiding hole 151 of the guiding seat 150 from the middle of the first elastic element, and then the guiding seat 150 may be screwed into the positioning hole 112 of the base body 110 of the execution system. Therefore, the positioning boss 152 of the guiding seat 150 may be engaged and fastened with the positioning hole 112 of the base body 110 of the execution system, while ensuring that the upper surface of the movable member 120 and the convex surface at the left end of the lever 141 may be completely fitted together. The piezoelectric actuator may fully transmit the displacement of and force transmitted by the lever 142 to the movable member 120, so that the movable member 120 may be raised in height and the impact force thereof may be effectively regulated.

A fluid micro-injection device according to an embodiment of the present disclosure may include the execution system 100 of the fluid micro-injection device according to the above described embodiment(s). The execution system 100 according to the above embodiment of the present disclosure may have the above-described technical effects. Accordingly, the fluid micro-injection to the embodiment of the present disclosure may also has the corresponding technical effects as mentioned above, i.e., the fluid ejection effect may be effectively adjusted etc.

In the description of the present specification, the description with reference to the terms "one embodiment", "some embodiments", "illustrative embodiment", "example", "specific example", or "some examples", etc. refer to particular features, structures, materials or characteristics described in the embodiments or examples included in at least one embodiment or example of the present disclosure. In the present specification, the schematic representation of the above terms does not necessarily mean the same embodiment or example. Furthermore, described particular features, structures, materials or characteristics may be combined in a suitable manner in any one or more embodiments or examples.

While the embodiments of the present disclosure have been shown and described, the embodiments of the present disclosure may be changed, varied and replaced for those skilled in the art without departing from the spirit and scope of the present disclosure, whereby the scope of the present disclosure is defined by the claims and their equivalents.

What is claimed is:

1. An execution system for a fluid micro-injection device, comprising:
    a base body defining an executor mounting cavity therein, and the base body being provided with a positioning hole that communicates with the executor mounting cavity;
    a movable member movably disposed in the positioning hole;
    an executor movably disposed in the executor mounting cavity, the executor being connected with the movable member to control movement of the movable member;
    an adjusting member disposed in the executor mounting cavity and connected with the executor to adjust operating position of the executor; and
    a plurality of clearance sheets disposed between an inner wall surface of the executor mounting cavity and the adjusting member to adjust a pre-tightening force of the executor.

2. The execution system according to claim 1, wherein the executor comprises:
    a lever disposed in the executor mounting cavity with both ends thereof being movable, and a first end of the lever being connected with the movable member to control movement of the movable member;
    an actuator telescopically disposed within the executor mounting cavity, the actuator being connected to a second end of the lever to control movement of the lever, wherein the adjusting member is connected with the actuator to adjust the operating position of the actuator, the clearance sheets being disposed between the inner wall surface of the executor mounting cavity and the adjusting member to adjust the pre-tensioning force of the actuator; and a controller connected with the actuator to control extension and draw back of the actuator.

3. The execution system according to claim 2, wherein the executor further comprises a swing pin shaft disposed within the executor mounting cavity, an axis of the swing pin shaft is perpendicular to an axis of the actuator which is offset from the axis of the actuator in a horizontal direction, and the second end of the lever is connected to the swing pin shaft to pivot about the swing pin shaft.

4. The execution system according to claim 3, wherein the swing pin shaft is formed in a column shape, and the base body is provided with a positioning groove adapted to mount the swing pin shaft, a lower surface at the second end of the level is provided with a fitting concave surface that fits with the swing pin shaft, and the swing pin shaft is disposed between the positioning groove and the fitting concave surface.

5. The execution system according to claim 4, wherein a cross section of the positioning groove is formed into an arcuate shape and a radius of the positioning groove is equal to that of the swing pin shaft, a cross section of the fitting concave surface is formed into an arcuate shape and a radius of the fitting concave surface is larger than that of the swing pin shaft.

6. The execution system according to claim 4, wherein one end of the swing pin shaft is provided with an end boss, and the end boss abuts against a bottom surface at the second end of the lever to limit a mounting height of the lever.

7. The execution system according to claim 2, wherein the adjusting member is provided at an upper end of the actuator, an upper actuator top block is disposed between the adjusting member and the upper end of the actuator, a lower actuator top block is disposed between a lower end of the actuator and the second end of the lever, and the lower actuator top block abuts against the lower end of the actuator and the second end of the lever.

8. The execution system according to claim 7, wherein a lower surface of the adjusting member is formed as an upwardly concave curved surface, an upper surface of the upper actuator top block is formed as an upwardly projecting curved surface, and a radius of the upper surface of the upper actuator top block is smaller than that of the lower surface of the adjustment element.

9. The execution system according to claim 7, wherein an upper surface of the second end of the lever is provided with a first protrusion, a cross section of which is formed into an arcuate shape, and a lower surface of the lower actuator top block is provided with a notch, a cross section of which is formed in an arcuate shape, and a radius of the first projection is smaller than a radius of the notch.

10. The execution system according to claim 2, wherein a lower surface of the first end of the lever is provided with a second protrusion, a cross section of which is formed in an arcuate shape and the second protrusion abuts against an upper end surface of the movable member.

11. The execution system according to claim 2, further comprising:

a guiding seat disposed in the positioning hole, wherein the guiding seat is provided with a guiding hole penetrating through in an axial direction thereof, and the movable member is movably disposed on the guiding seat along the axial direction of the guiding hole.

12. The execution system according to claim 11, wherein the movable member comprises:

a cylindrical shaft movably disposed in the guiding hole along an axial direction thereof, and a lower end of the cylindrical shaft being formed as a ball head; and an upper end part disposed at an upper end of the cylindrical shaft, the upper end part having a size larger than a radius of the cylindrical shaft, and a first elastic element being disposed between the upper end part and the guiding seat.

13. The execution system according to claim 12, wherein the guiding seat comprises:

a positioning boss detachably disposed in the positioning hole; and an upper convex cylinder disposed at an upper portion of the positioning boss and disposed coaxially with the positioning boss, wherein a radial dimension of the upper convex cylinder is smaller than a radial dimension of the positioning boss, the guiding hole penetrates through the upper convex cylinder and the positioning boss, and the first elastic element is formed as a spring that sleeves on the upper convex cylinder with both ends abutting against the positioning boss and the upper end part respectively.

14. The execution system according to claim 11, wherein one end of the positioning hole communicating with the executor mounting cavity is provided with a positioning recess having a radius that is larger than that of the positioning hole, the execution system further includes:

a positioning seat disposed in the positioning recess, the guiding seat extending through the positioning seat in the axial direction; and a second elastic element disposed between the positioning seat and the first end of the lever.

15. The execution system according to claim 14, wherein the second elastic element is formed as a spring, and both ends of the second elastic element abut against an upper surface of the positioning seat and a lower surface of the first end of the lever respectively.

16. The execution system according to claim 15, wherein an outer contour of the positioning seat is formed substantially with a square shape, an outer circumference of the upper surface of the positioning seat is provided with a plurality of projecting portions spaced apart circumferentially, and an inner surface of each projecting portion is formed with an arcuate face corresponding to a shape of the outer contour of the second elastic element.

17. A fluid micro-injection device comprising an execution system according to claim 2.

18. A fluid micro-injection device comprising an execution system according to claim 1.

* * * * *